Patented Aug. 25, 1953

2,650,196

BEST AVAILABLE COPY

UNITED STATES PATENT OFFICE 2,650,196

WELL DRILLING COMPOSITION AND METHOD OF MANUFACTURE THEREOF

Henry W. Rahn, Corpus Christi, Tex.

No Drawing. Application April 21, 1953,
Serial No. 349,993

22 Claims. (Cl. 252—8.5)

1

This invention relates to a well treating composition suitable for use in well drilling fluids and has particular relation to their application to drilling oil and gas wells.

In such uses, a mud laden fluid is used in rotary drilling of such wells. The fluid is pumped down through the drill system to the bit and then flows upward in the annular space between the drill stem and the walls of the bore hole. The fluid serves several purposes. It carries cuttings and sand, working in at the base of the bore hole, to settling areas where these cuttings and rock particles settle out. Gas coming from the bore hole and entrained in the fluid bubble out in the settling area. The fluid is then pumped back to the drill stem and the cycle is repeated.

Another function of the fluid is to cool and lubricate the bit. The fluid also seals the walls of the well, thereby preventing undesirable seepage of gases and liquids into the bore hole, loss of drilling fluid into the formation being drilled, and caving in of the formation.

The drilling fluid must be colloidal in order that enough clay particles can be maintained in suspension to impart to the mud a high density sufficient to produce adequate hydrostatic pressure. Also, the colloidal nature of the mud makes it more effective in plastering the walls of the bore hole to seal off porous formations and to assist in carrying cuttings out of the hole.

Too much colloidal material renders the fluid too viscous, thereby making it difficult to pump. On the other hand, fluids made from clays having a deficiency of colloidal material must be improved by addition of a highly colloidal clay such as bentonite. It is desirable that the fluid possess thixotropic properties in order that the cuttings do not settle and clog the bore hole in the event of temporary suspensions in the drilling operations.

In addition, the drilling fluid sometimes must combat formations known as heaving shale. Heaving shale is believed to be caused by the hydration of shale particles with water from the ordinary drilling fluids. It is highly sensitive to water and highly colloidal. The shale swells, disintegrates, and flows into the bore hole, often clogging the drilling tools.

Ordinary drilling fluids are created by using water as the liquid disperse phase and combining with it mud or clays from the bore together with additional material capable of imparting advantageous properties to the fluid.

According to the present invention, a novel well treating composition has been produced,

2 and a novel method of producing such composition has been provided. This composition comprises the reaction product of tree bark, preferably in a shredded or pulverulent state, with sodium hydroxide or like alkali metal hydroxide. The composition may or may not contain other components such as free alkali metal hydroxide and solid inert diluents, for example calcium carbonate and the like, all as more fully set forth hereinafter.

The composition which is contemplated herein may be prepared, according to this invention, by dispersing tree bark containing the desired concentration (10% or more) of natural tannins therein in aqueous alkali metal hydroxide solution and heating the solution to an elevated temperature to dehydrate the mixture. During the dehydration, digestion of the tannates as well as other bark components and reactions of an unknown character occur. This digestion and/or heating appears to exert certain advantageous influences as will be explained more fully hereinafter. The advantageous characteristics which are thus achieved may be due to partial oxidation of the product during heating, to more thorough reaction of the sodium hydroxide with the tannate, to modification of the tannate molecule, to reaction of non-tannins in the bark and/or to other causes.

The composition thus obtained is valuable as a drilling fluid additive since it is in the form of a dry, pulverulent powder which remains in a pulverulent state even under conditions of high humidity. It is convenient to handle and may be used with comparative safety by drilling crews without the danger of burns and like injuries and without excessive wastage. Furthermore, the composition thus produced disperses quite readily in drilling fluids and is less expensive to use than comparable compositions produced from tannin extracts, such as quebracho, because of its higher efficiency and lower wastage.

According to the method herein contemplated, a suitable bark, notably wattle or mangrove bark, is shredded or otherwise broken up into chips having a thickness, preferably less than ⅛ of an inch. These chips are then introduced into a solution of an alkali metal hydroxide, such as aqueous sodium hydroxide.

Frequently, the bark is broken up by passing it through a hammer mill or like conventional means for grinding or shredding the bark and the resulting product is dumped into an aqueous sodium hydroxide solution. This solution is then heated to a temperature approximating its boiling point and maintained in that condition to bring about a disintegration of the bark structure. The resulting hot solution is delivered to a suitable drying equipment, such as a drum, tray or spray dryer where the material is dried to a solid state; at room temperature this product is dry to touch but may or may not be completely anhydrous.

Where the alkali metal hydroxide content of the produce is high, it is advantageous to incorporate a solid diluent in the mixture prior to drying. Unless such solid diluent is incorporated, it often is found that such mixtures, during drying become sticky and do not dry effectively. On the other hand, when such diluents are used, little or no caking of the product is observed during the dehydration and a dried product which shows little tendency to agglomerate on standing is produced. Calcium carbonate has been found to be an especially effective diluent for this purpose. Other typical materials which are suitable include calcium hydroxide, barium carbonate, magnesium carbonate, and other alkaline earth carbonates or hydroxides, metal oxides and like oxides, including zinc oxides, titanium dioxide, silica, calcium oxide, magnesium oxide, silicates such as precipitated magnesium silicate, or like alkaline earth metal silicates, clay, including bentonite clay, kaolin, montmorillonite, fuller's earth, or like adsorbent clay, barium sulfate, calcium sulfate, lamp black, gas black, and other carbon blacks. Such diluents possess absorbent characteristics which tend to improve the product.

For most purposes, it is desired that the inert solid diluent be essentially insoluble in water. This is not absolutely necessary since soluble diluents can be used to prevent the agglomeration and the caking which occurs during drying. Thus, sodium carbonate may be used for this purpose. On the other hand, it is generally found advantageous to utilize a diluent which has a low water solubility (below 1% by weight) since, otherwise, the diluent may have an adverse effect upon the drilling fluid. Furthermore, it is preferred that the diluent be non-hygroscopic in order that the product, once dried, remain in a pulverulent state.

The diluent should be relatively fine to permit ready dispersion throughout the composition. Generally, diluents having a particle size below about 20 mesh will be satisfactory.

The amount of diluent which may be present will vary in accordance with the type of bark used. Thus, where the woody and fibrous content of the bark is high as in the case of mangrove and wattle barks, the diluent may be low and frequently eliminated. On the other hand, barks having high tannin content or high extractable contents and low fibrous content generally require an appreciable amount of diluent. Likewise, compositions containing small amounts of alkali metal hydroxide do not require as much diluent as do compositions containing large amounts of alkali metal hydroxides. Thus, diluent concentrations of 5 to 50 percent by weight of the alkali metal hydroxide and bark in the composition are used where necessary. Larger amounts of diluent usually are unnecessary although they rarely exert an adverse effect. The amount of diluent used seldom exceeds twice the amount of alkali metal hydroxides and alkali metal tannate in the composition.

The amount of alkali metal hydroxide used should be at least sufficient to react with the tannin and to produce an alkaline product. It will be understood that a bark such as mangrove or wattle bark contains a number of components including fibrous material, water soluble tannins, water soluble non-tannins, lignins, etc. The amount of tannin in such barks may be determined readily by extracting the bark with water and titrating the solution by standard methods. The amount of alkali metal hydroxide should be in excess of that required to react with the tannin in the bark. When further alkali is present it can react with other bark components such as the non-tannins, lignins, etc. Thus, these components which are not normally active are made active by the treatment herein contemplated.

The exact amount of alkali metal hydroxide used varies with the barks which inevitably vary in composition. To achieve optimum results about 1 to 5 parts by weight of bark is treated per part by weight of alkali metal hydroxide. However, larger and smaller amounts of alkali metal hydroxide can be used although it is rare that more than about 12 parts of bark are used per part of alkali metal hydroxide. Moreover, it is rare that the amount of alkali metal hydroxide will exceed two to four parts by weight of sodium or equivalent hydroxide by weight of bark. These amounts of alkali metal hydroxide produce a product, a 2% water solution of which has a pH of about 9 or above.

Where the amount of alkali metal hydroxide used is high (above about 1 NaOH to about 5 of bark in the case of mangrove bark) the resulting product contains free alkali metal hydroxide, and such larger amounts often are advantageous.

Alkali metal hydroxide solutions of any convenient concentration may be used, so long as the solutions are liquid. Preferably, solutions containing 5 to 50 per cent by weight of NaOH are used. More concentrated solutions may be used but are so viscous that difficulty is frequently encountered in handling the resulting products. On the other hand, more dilute solutions are objectionable because of the large amount of water which must be evaporated.

As previously stated, the aqueous mixture or slurry of alkali metal hydroxide and tree bark is digested at a temperature approximating the boiling point and then evaporated to dryness. This dehydration is continued until a produce which is substantially dry to touch at room temperature is produced. Such product may contain as much as about 15% by weight or even more of moisture although the composition preferably has a moisture content somewhat below 25% by weight.

The process herein described has been found to be especially advantageous in that it imparts improved properties to the composition which are not achieved simply by mixing the bark with alkali metal hydroxide solution in the cold. Thus, it has been determined that a composition which has been produced according to the present invention more effectively reduces the viscosity of drilling muds than do comparable compositions formed by mixing bark with alkali metal hydroxide in the cold. Furthermore, the compositions produced according to the present invention are more readily soluble and dispersible in drilling fluids than are compositions formed by simple mixing in the cold.

These advantageous results are achieved to a large degree by virtue of the heat applied to the mixture during the drying or during digestion prior to drying and it appears that a substantial reaction takes place between the reaction components. The rate at which this reaction occurs is influenced appreciably by the temperature of heating, the reaction being more rapid at high temperatures than at lower temperatures.

In general it is found best to effect at least the final states of heating of the composition at a temperature above about 100° C., preferably 150° to 350° C., but below the temperature at which bark components pyrolyze. A relatively short period of such heating, for example, 30 seconds to several minutes is permissible. On the other hand, baking for several hours at an elevated temperature often produces further improvement in the properties of the product. The temperature of this heat treatment should not be excessive. Temperatures of above about 100° C., preferably 150 to 350° C., normally are suitable. At lower temperatures much longer periods of heating are required to achieve equivalent results.

Prior to drying to a solid product digestion of the bark-alkali metal hydroxide solution is advantageous in order to insure relatively complete reaction. This digestion may be conducted over a period of 15 minutes to 24 hours, usually 1 to 8 hours at a temperature of about 75 to 100° C.

The product after drying is a dry pulverulent brown to black solid which is the reaction product of the sodium hydroxide with the bark and/or its components. It appears homogeneous to the eye and is readily dispersed or dissolved in water. It is in a granular form and for convenience usually is reduced to a particle size where a preponderant amount (90% or more) will pass through a 10 mesh screen.

The products produced as herein contemplated are especially valuable because of their high content of tannin and also because the lignins and other materials not normally active are made active by the treatment herein contemplated. When a product prepared from a bark such as wattle or mangrove bark according to this invention is dissolved in water, the resulting solution exhibits little tendency for the bark fibers and other components to settle from the solution. This essential freedom from sedimentation is particularly important since it permits ready incorporation of the composition into a drilling mud simply by making a solution of the herein contemplated novel composition beforehand and introducing this solution at a slow continuous rate into the mud during drilling operations. Such introduction is not obstructed by virtue of settling or sedimentation which clogs valves and other outlets into the drilling fluid. Products which are especially valuable are obtained when mangrove or wattle bark are treated according to this process. Thus, mangrove bark which contains less tannin per pound than quebracho extract may be treated according to this invention and used on an equal weight basis in place of the more expensive quebracho extract. Wattle bark may be used in the same way.

It will also be understood that various other barks are suitable for the purpose herein contemplated. For example, redwood bark has been found to be effective. Moreover, other barks including pine bark, chestnut bark, oak bark, hemlock bark, spruce bark, fir bark, and like whole barks commonly used as a source of tannin in various industries, such as the leather industry, may be used according to this invention. Moreover, seed pods, oak and other galls, wood, pecan shells and like fibrous products which contain tannin may be used.

The tannin or humic acid content of such components should not be unduly low and in most cases it is desired to use materials containing in excess of about 10 percent of tannin and/or humic acid.

If necessary, standard anti-foaming agents and anti-fermenting agents may be incorporated if desired. Normally no objectionable amount of foam is produced in use of a composition of the type herein contemplated in which a bark, such as wattle bark, is a component. On the other hand, agents which tend to cause foam sometimes are present in barks. If such agents are in concentrations such as to make foaming a serious problem in oil well drilling, typical anti-foaming agents may be added to the composition, such as linseed oil, cresol, octyl alcohol, castor oil and like anti-foaming agents. Furthermore, some barks and fibrous materials contain appreciable concentrations of sugars, and like carbohydrates. In that case, drilling fluids in which these compositions have been incorporated sometimes evidence a tendency to ferment, particularly where the pH of the drilling fluid is below about 10. In such case standard agents capable of inhibiting fermentation may be incorporated.

The drilling fluid compositions herein described are capable of use with various types of drilling fluids. Commonly used drilling fluids as previously noted, comprise an aqueous fluid suspension of clay, usually including an appreciable amount of bentonite or like type of clay which swells readily and which forms a thixotropic suspension. Such a mud may be loaded with other weighting agents including barytes, iron oxide and like materials if desired. The compositions herein described are particularly useful in the treatment of muds of this character. However, various other muds may be treated by these compositions.

An effective mud which has been found to be especially suitable for deep well drilling is obtained by a treatment of bentonite or like clays with calcium compounds to base exchange the naturally occurring sodium content of the bentonite or like clay with calcium to form what is commonly called calcium bentonite. Muds containing such calcium bentonite have been found to be quite effective in deep well drilling. The compositions herein described and claimed are very effective in the treatment of such muds.

In addition, it is not uncommon to use a drilling fluid in which the liquid phase is an oil in water emulsion. Because of the natural tendency of oil to settle out from water, it is necessary in such cases to use emulsifying agents to cause the oil to disperse in the form of a stable emulsion. Moreover, it is important that mud treating agents used in connection with such oil drilling fluids be of a character such that they do not disturb the stability of the emulsion adversely. The compositions herein contemplated have been found to effectively stabilize the emulsion and thus have the advantage of permitting the use of less emulsifier or even permitting the elimination of the emulsifier. This eliminates or minimizes the requirement for specially prepared expensive emulsions and permits the use of cheaper base oils which are commonly available in drilling areas. It has been found that the tendency of the compositions herein contemplated to stabilize emulsions is markedly enhanced by the drying and/or baking operation.

That is, when wattle bark or like bark is simply dispersed in alkali metal hydroxide solutions little tendency toward emulsification is observed. On the other hand, by producing the wattle bark-sodium hydroxide product according to the process described herein, the resulting product is a much more effective emulsifying agent than the simple mixture of the bark and the solution. This has also been found to be the case when extracts such as quebracho extract, wattle extract, and like tannin extract are used in lieu of the bark.

The following examples are illustrative of the invention.

EXAMPLE I

A milk of lime slurry was made up containing 322 grams per liter of calcium oxide in the form of calcium hydroxide. This slurry also contained approximately 25 grams per liter of calcium carbonate. Four hundred pounds of ground wattle bark, 332 pounds of an aqueous solution of sodium hydroxide containing 50% by weight of sodium hydroxide, 133.2 pounds of sodium carbonate were mixed together with sufficient of the milk of lime slurry described above to introduce 70.2 pounds of calcium oxide into the mixture. This mixture was boiled with stirring to effect a solution of the soluble components thereof at a temperature of approximately 90 to 100° C. Thereafter, the resulting mixture was fed directly to a drum dryer which was heated directly by steam at a 100 pounds per square inch gauge pressure. Thus, the heating temperature was approximately 170° C. The product undergoing drying remained at this elevated temperature or closely thereto for several minutes. This material was then put through a hammermill in order to grind it to a size which would pass approximately a 10 mesh screen. The resulting product was a black, granular product which contains about 10.4% by weight of moisture.

The following table indicates the amount of reduction in viscosity which was achieved by adding various amounts of the resulting wattle bark product to a synthetic drilling fluid prepared by concentrating natural shale mud obtained from an oil well in the Borregas Field in Texas to a viscosity of 60 centipoises.

| Pounds of Product Per Barrel of Mud | Viscosity, Centipoises |
|---|---|
| 0.00 | 57 |
| 0.91 | 64 |
| 1.82 | 44 |
| 2.73 | 25 |
| 3.63 | 8 |
| 5.45 | 6 |
| 7.27 | 5 |

EXAMPLE II 50 grams of wattle bark which had been previously hammer milled to reduce the size of the wattle bark to below 10 mesh was added to 33 grams of aqueous sodium hydroxide solution containing 50% by weight of NaOH. The product was thoroughly mixed and then dried at 190° C. for three hours. This product effectively reduced the viscosity of standard muds when added thereto.

EXAMPLE III

Two hundred pounds of shredded redwood bark produced by passing redwood bark through a hammer mill were added to a slurry containing 133 pounds of a caustic solution containing 50% by weight of NaOH. Fifty pounds of commercial sodium carbonate and 64 pounds of CaO (as a milk of lime suspension containing 318 grams per liter of active CaO and 18 grams per liter of calcium carbonate), were added to the mixture. The mixture was stirred strongly and heat applied by direct and indirect application of steam to raise the temperature of the mixture to about 90 to 100° C. During this heating, sufficient water was added to dilute the slurry to a degree sufficient to permit ready delivery of the mixture to a drum dryer by means of a centrifugal pump and also to permit efficient drying upon the drum dryer.

The feed liquid was thus fed to a drum dryer in which the roller speed of the dryer was 2 R. P. M. and the roller temperature was about 170° C. (the temperature being established by virtue of steam supplied to the roller or drum at 100 p. s. i. gauge). After drying, the product was ground to a uniform coarse particle size by means of a hammer mill. Analysis of the ground product showed a moisture content of 9.7% by weight, a calcium content of 9.9%, computed as calcium carbonate, and an available alkali content, based upon titration with methyl orange and correcting for calcium carbonate content of 37.3% expressed as NaOH.

Tests were made with this material using a mud of the type described in Example 1. The following data summarize the results obtained:

*Viscosity reduction*

| Lbs. Product Bbl. Mud | Viscosity in Centipoises |
|---|---|
| 0.00 | 54 |
| 0.67 | 48 |
| 1.34 | 31 |
| 2.03 | 15 |
| 2.68 | 6 |
| 4.02 | 5 |
| 5.36 | 5 |

EXAMPLE IV 32 grams of peeled pine bark was mixed with 32 grams of an aqueous caustic soda solution containing 50 percent by weight NaOH and enough water was added to permit complete dispersion of the bark and caustic. The mixture was taken to dryness and then baked in an oven for 20 hours at 175–185° C. The baked product weighed 38.6 grams. The following table illustrates results obtained when this product was added to a mud obtained from the Paso Ancho Oil Field in Texas which had been concentrated to 60 centipoises.

| Pounds Product per barrel of mud | Viscosity in Centipoises |
|---|---|
| 0.00 | 60 |
| 0.15 | 61 |
| 0.30 | 55 |
| 0.60 | 27 |
| 0.90 | 26 |
| 1.20 | 19 |
| 1.81 | 13 |
| 2.41 | 12 |
| 3.02 | 11 |
| 3.62 | 9 |

EXAMPLE V 700 gallons of aqueous sodium hydroxide solution containing 50% NaOH by weight was mixed in a mixing tank with 2500 gallons of water and the resulting solution was heated to 212° F. 2000 pounds of mangrove bark containing 30% by weight of tannin (determined by the Loewenthal Proctor method, was added slowly to the hot solution over a period of 6 hours while maintaining the temperature of the mixture at 212° F. by introduction of steam therein. Following the addition, the mixture was digested for 10 hours at about 220° F. Thereupon 4000 pounds of lignite containing about 37% by weight of humic acid was added to the mixture and the mixture was further digested for 2 hours at 220° F. Following this, the mixture was fed to a pair of drum dryers having their faces spaced approximately 0.06 inch apart and heated by dry steam at a pressure of 130 pounds per square inch. In this way a product having a granular character was produced.

Other compositions may be prepared in a manner similar to the methods outlined in the above examples.

Typical compositions which may be prepared in this manner include the following:

| | Parts by weight |
|---|---|
| Sodium hydroxide | 50 |
| Wattle bark | 80 |
| Sodium hydroxide | 100 |
| Redwood bark | 200 |
| Sodium hydroxide | 100 |
| Wattle bark | 150 |
| Calcium carbonate | 40 |
| Sodium hydroxide | 100 |
| Redwood bark | 200 |
| Calcium carbonate | 50 |

It will be observed that frequently mangrove, redwood, and like barks do not require introduction of further solid diluent because of the fibrous content thereof. To a large extent, the requirement of further diluent depends to a degree upon the content of the tannin in the bark and also upon the mode of drying used. When a drum dryer is used, it is often advantageous to use some diluent, such as calcium carbonate or like diluent, as listed above, in order to prevent caking on the drum. With other methods of drying such diluents may be necessary. The in situ precipitation of CaCO₃ by causticization of sodium carbonate with lime is a convenient means of providing diluent needs while simultaneously furnishing some of the sodium hydroxide requirements.

While the invention has been described with particular reference to sodium hydroxide, it is to be understood that other alkali metal hydroxides also may be used in lieu of, or in conjunction with, sodium hydroxide. Typical alkali metal hydroxides include potassium hydroxide and lithium hydroxide. However, best results are obtained when sodium hydroxide is used. It is also to be understood that while the compositions herein described have been referred to as well treating compositions, they may be used for other purposes as for example in boiler compositions, in the tanning industry etc.

Although the present invention has been described with reference to the specific details of certain embodiments thereof, it is not intended that such details shall be regarded as limitations upon the scope of the invention except insofar as included in the accompanying claims.

This application is a continuation in part of my copending applications Serial Nos. 114,461, filed September 7, 1949 and 169,781 filed June 22, 1950, the latter having now been abandoned.

What is claimed:

1. A method of preparing a composition which comprises forming an aqueous dispersion of a tannin containing bark and sodium hydroxide in an amount in excess of that which will react with the bark components, and heating the mixture at a temperature above 100° C. but below a temperature at which substantial pyrolysis of the bark components occurs, until a dry product is obtained.

2. A method of preparing a composition which comprises forming an aqueous dispersion of wattle bark and sodium hydroxide in an amount in excess of that which will react with the bark components, and heating the mixture at a temperature above 100° C. but below a temperature at which substantial pyrolysis of the bark components occurs, until a dry product is obtained.

3. A method of preparing a composition which comprises forming an aqueous dispersion of bark, sodium hydroxide in an amount in excess of that which will react with the tannin in the bark, and an inert solid diluent, and heating the mixture at a temperature above 100° C. but below a temperature at which substantial pyrolysis of the bark components occurs, until a dry product is obtained.

4. A method according to claim 3 wherein the inert diluent is calcium carbonate.

5. A well treating composition which comprises the reaction product of tree bark and sodium hydroxide which has been prepared by heating tree bark with 0.2 to 4 parts by weight of sodium hydroxide in the form of an aqueous solution of sodium hydroxide containing 10 to 50 per cent by weight of sodium hydroxide at a temperature above 100° C. to vaporize water therefrom and to obtain a solid product.

6. The composition of claim 5 wherein the temperature of drying is 150° to 350° C.

7. A method of preparing a well-treating composition which comprises forming an aqueous dispersion of tree bark containing at least 10 percent by weight of tannin and a sodium hydroxide solution containing 10 to 50 percent by weight of sodium hydroxide the amount of sodium hydroxide being in excess of that required to react with the tannin in the bark and heating the mixture at a temperature above 100° C., but below the temperature at which substantial pyrolysis of the bark components occurs, until a solid product is obtained.

8. The process of claim 7 wherein the amount of 1 to 5 parts by weight of tree bark is used per part of sodium hydroxide.

9. A solid, granular well-treating composition comprising the reaction product of alkali metal hydroxide and tree bark which has been produced by heating a mixture of alkali metal hydroxide the amount of alkali metal hydroxide being in excess of that required to react with the tannin in the bark, water, and tree bark at a temperature above 100° C., but below a temperature at which substantial pyrolysis of the bark components occurs.

10. A solid, granular well-treating composition comprising the reaction product of alkali metal hydroxide and tree bark which has been produced by heating a mixture of alkali metal hydroxide the amount of alkali metal hydroxide being in excess of that required to react with the tannin in the bark, an inert solid diluent, water, and tree bark at a temperature above 100° C. but below a temperature at which substantial pyrolysis of the bark components occurs.

11. A solid, granular well-treating composition comprising the reaction product of alkali metal hydroxide and tree bark which has been produced by heating a mixture of alkali metal hydroxide the amount of alkali metal hydroxide being in excess of that required to react with the tannin in the bark, finely divided calcium carbonate, water, and tree bark at a temperature above 100° C., but below a temperature at which substantial pyrolysis of the bark components occurs.

12. A solid, granular well-treating composition comprising the reaction product of sodium hydroxide and tree bark which has been produced by heating a mixture of sodium hydroxide the amount of sodium hydroxide being in excess of that required to react with the tannin in the bark, water, and tree bark at a temperature above 100° C., but below a temperature at which substantial pyrolysis of the bark components occurs.

13. The composition of claim 10 wherein the diluent is finely divided alkaline earth metal carbonate.

14. A solid, granular well-treating composition comprising the reaction product of sodium hydroxide and wattle bark which has been produced by heating a mixture of sodium hydroxide the amount of sodium hydroxide being in excess of that required to react with the tannin in the bark, water, and wattle bark at a temperature above 100° C., but below a temperature at which substantial pyrolysis of the bark components occurs.

15. A method of preparing a composition which comprises forming an aqueous dispersion of tree bark and an amount of alkali metal hydroxide which is substantially in excess of the amount required to react with the tannin in the bark and heating the resulting mixture at a temperature above about 100° C., but below the temperature at which substantial pyrolysis of the bark components occurs, until a dry product is obtained.

16. The method of claim 15 wherein the bark is mangrove bark.

17. The method of claim 15 wherein the bark is wattle bark.

18. The method of claim 1 wherein the tree bark contains at least 10 percent by weight of tannin.

19. The composition of claim 15 wherein the tree bark contains at least 10 percent by weight of tannin.

20. The method of claim 15 wherein the alkali metal hydroxide is sodium hydroxide and the temperature of heating is 150° to 350° C.

21. In a process for drilling a well with well drilling tools wherein there is circulated a water-base drilling mud containing clayey material suspended in sufficient aqueous medium to render the same circulatable, the method which comprises admixing with said mud and interacting therewith the composition produced according to claim 15 in an amount sufficient to adjust the viscosity of the mud and to maintain the mud in a circulatable state, and circulating the resulting mud through the well during drilling thereof.

22. The process of claim 9 wherein the sodium hydroxide bark mixture is digested at 75 to 100° C. before heating above 100° C.

HENRY W. RAHN.

References Cited in the file of this patent

UNITED STATES PATENTS

| Number | Name | Date |
|---|---|---|
| 411,320 | Boogher | Sept. 17, 1889 |
| 958,893 | Ridenour | May 24, 1910 |
| 1,999,766 | Lawton et al. | Apr. 30, 1935 |
| 2,109,858 | Cannon | Mar. 1, 1938 |
| 2,376,885 | Sherwood | May 29, 1945 |
| 2,549,142 | Thompson | Apr. 17, 1951 |
| 2,560,930 | Campise | July 17, 1951 |

OTHER REFERENCES

Rogers, Composition and Properties of Oil Well Drilling Fluids, 1st ed., pub. 1948 by The Gulf Publishing Co. of Houston, Texas. Pages 291 and 292.

Stern, Role of Clay and Other Minerals in Oil Well Drilling Fluids, Bureau of Mines Report of Investigations No. 3556. Page 68, February 1941.